United States Patent
Crawford

[15] 3,684,027
[45] Aug. 15, 1972

[54] GRASS EDGER

[72] Inventor: Howard H. Crawford, c/o Blair-Hall Co., Inc., 206 Reynolds, El Paso, Tex. 79905

[22] Filed: May 1, 1970

[21] Appl. No.: 33,591

[52] U.S. Cl. ...................172/15, 172/17, 172/540, 56/256, 83/469, 83/663, 83/698, 287/119
[51] Int. Cl. ...........................................A01b 45/100
[58] Field of Search..........................172/13–18, 21, 172/45; 83/660, 698, 469, 663; 30/299; 56/256, 294–295, 400

[56] References Cited

UNITED STATES PATENTS

| | | | |
|---|---|---|---|
| 2,707,859 | 5/1955 | Walker | 172/15 |
| 3,590,926 | 7/1971 | Tepera | 172/15 |
| 3,018,602 | 1/1962 | Diesterweg | 56/295 |
| 2,888,993 | 6/1959 | Dunning | 172/15 |
| 2,791,077 | 5/1957 | Lyle | 56/256 |
| 2,663,137 | 12/1953 | Asbury | 56/299 |
| 2,676,448 | 4/1954 | Limberger | 56/256 |

*Primary Examiner*—Robert E. Pulfrey
*Assistant Examiner*—C. W. Hanor
*Attorney*—Clarence A. O'Brien and Harvey B. Jacobson

[57] ABSTRACT

A grass cutting head having a driving shaft mounting axially spaced flange and plate components. Angularly spaced collars are rotatably supported from one side of the flange. A plurality of radially extending nails, serving as cutting bars, are axially removably received in the ends of the collars remote from the plate. An axially mounted coil spring forces the plate component into clamping engagement with the ends of collars remote from the plate so that the nails are retained in the collars. By pulling the plate against the spring, the plate is moved away from the collars thereby exposing the nails. Once exposed, the nails can be removed and replaced. Then, the plate is replaced to its original clamping position.

6 Claims, 5 Drawing Figures

PATENTED AUG 15 1972 3,684,027
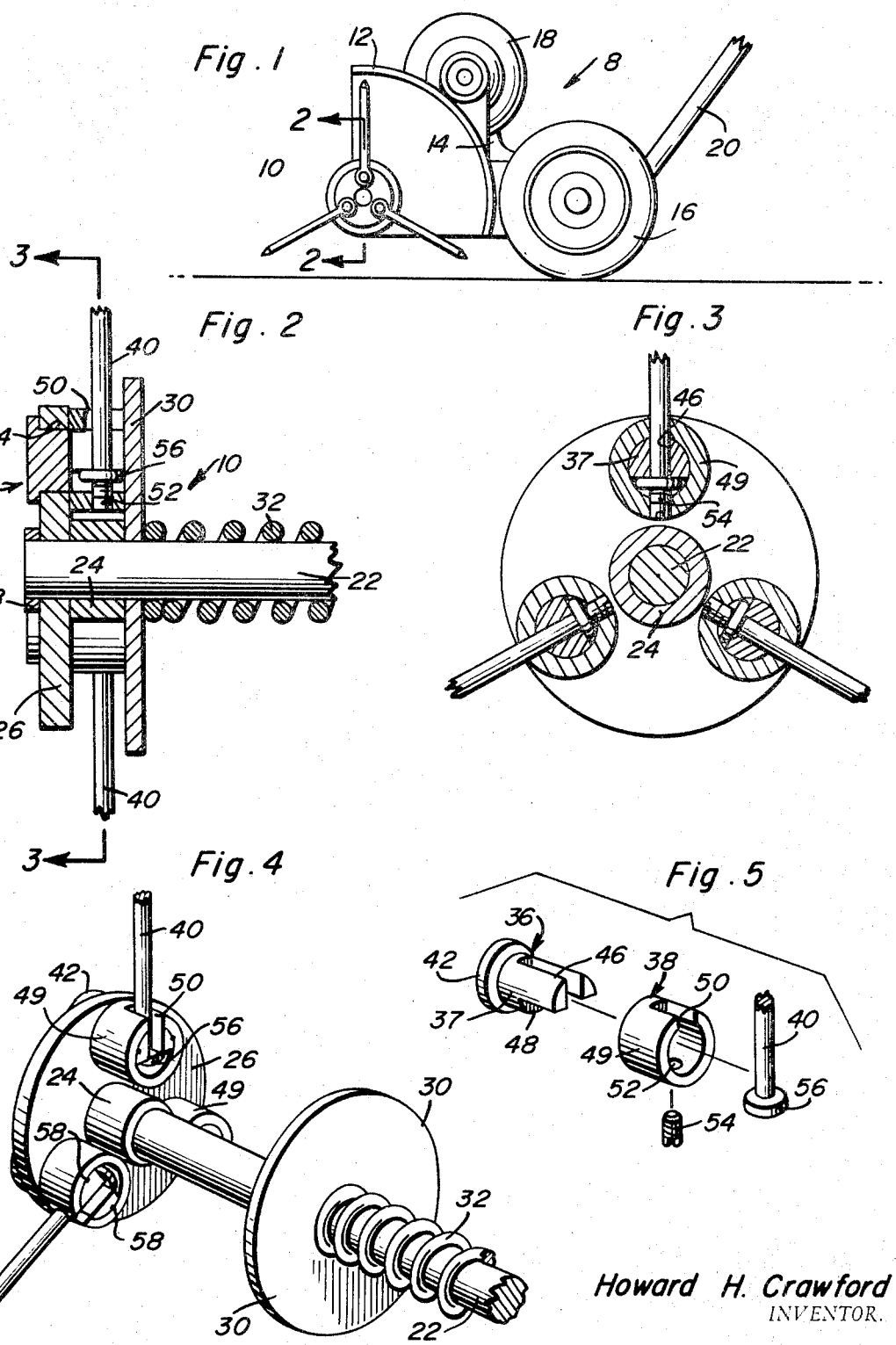
Howard H. Crawford
INVENTOR.
BY Clarence A. O'Brien
and Harvey B. Jacobson
Attorneys

GRASS EDGER

The present invention relates to cutting heads and more particularly to a cutting bar assembly for lawn edgers.

In the past, lawn edgers have generally been somewhat complex and as a result rather expensive to fabricate. In particular, the cutting elements have required a machined edge which was believed necessary to achieve proper edging. Inasmuch as these cutting parts receive the most wear during operation of the device, they dull after some use and require replacement which imposes an inconvenience and expense on the user.

Recently, this problem has been obviated by using straight wire lengths serving as cutter bars. These cutter bars have been fabricated from wire generally similar to the wire use in wire clotheshangers. Although cutter bars of this variety are far less expensive than machined cutting blades, it has been found that the wire cutter bars frequently experience premature structural failure. As a consequence, injuries have been sustained by flying wire cutters. Also, the head assemblies for these wire cutters have been fabricated in a manner requiring the use of tools in order to remove and replace worn wire cutter bars.

The present invention is an improvement upon currently available cutter heads for lawn edgers and more particularly those of the unsharpened wire type. However, instead of the relatively unsafe hanger wire, the present invention utilizes available box nails which have great structural superiority over the wire previously used. In addition, the cutter head is designed to allow removal and replacement of the nails without special tools. Replacement in the present invention may be accomplished by simply forcing a biased component away from its nail securing position. Then, after the nail is removed, the component is again allowed to secure a newly replaced nail in proper position.

A lawn edger equipped with the present cutting head provides superior cutting performance over a longer period of time. Further, the design of the present invention insures the lawn edger user a greater degree of safety than has previously been possible.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a side elevational view illustrating the disposition of the present cutting bar head on a powered lawn edger tool.

FIG. 2 is an enlarged transverse sectional view taken along a plane passing through section line 2—2 of FIG. 1 illustrating the component parts of the present invention.

FIG. 3 is a sectional view taken along a plane passing through section line 3—3 of FIG. 2 and shows the disposition of nail cutter bars in respective collars.

FIG. 4 is a perspective view illustrating the disposition of the cutter bars in their collars, the view being taken when a component plate is moved against a biasing spring.

FIG. 5 is an exploded perspective view illustrating the two principal components of each collar.

Referring to the drawing and more particularly FIG. 1, a powered lawn edger tool is seen to be equipped with a rotary cutting head 10 which forms the present invention. That is to say, that the frame and motor for the cutting head are the same as currently utilized. These conventional parts include a cutting head shield 12 mounted to a frame 14 equipped with rear wheels 16. A motor 18, usually of the electric type is mounted to frame 14. Handle bar 20 is secured to the frame and permits the lawn edger to be steered.

Considering FIGS. 2–4, a drive shaft 22 axially mounts the components of the present invention. The shaft is usually coupled to the electric motor 18 from which it derives power to rotate.

An annular hub 24 is secured to an outward end portion of shaft 22 by suitable means such as a diametric pin, or the like and a disc-like flange 26 is mounted on the outward end of the hub.

A disc-like plate 30 is slidably and rotatably mounted in axially spaced relation to flange 26 and is clamped against the inward end of hub 24 by an axially mounted elongated coil spring 32. The right end of spring 32 is secured in place by a mechanical stop (not shown) such as a bushing secured in adjusted position on shaft 22 by a setscrew.

The flange 26 includes three bores 34 equally radially spaced from the shaft 22 and angularly displaced from one another by 120 degrees. These bores permit the insertion of collar means 36 clearly indicated in FIG. 2. More particularly, each collar means 36 includes a headed shank generally indicated by 37 that is adapted to axially mount a ring generally indicated by 38. The components 37 and 38 secure a box nail 40 therein, the nail serving as a cutting bar.

Considering FIG. 5 in greater detail, the headed shank 37 is seen to have an outwardly attached head 42 which abuts the outward surface of flange 26. The shank portion 37 passes through the bore 34 and includes two longitudinal quadrant projections separated by an axial recess 46 terminating inwardly at 48. Nail 40 is retained in the recess 46. Ring 38 coaxially embraces the headed shank and is seen to include a cylindrical body 49 having a longitudinal slot 50 formed therein which is aligned with the recess 46. Nail 40 is received in the slot 50 and is restricted from lateral movement by a setscrew 54 which extends inwardly through a threaded bore 52 formed in the ring 38. As clearly illustrated in FIG. 3, the inward end of setscrew 44 contacts the head 56 of the nail 40.

When assembling the cutting head, the headed shank 37 is assembled through flange 26. Ring 38 is slipped onto shank 37. Spot-welds 58 (FIG. 4) hold the shank and ring together. The nail 40 is positioned in the collar means composed of the headed shank 37 and ring 38 and after the setscrew 54 is tightened, the received nails appear as illustrated in FIG. 4. Plate 30 is then mounted on shaft 22 and positioned in abutting relation with hub 24, the collars being angularly positioned around the hub 24. Then, the axially mounted spring 32 is secured at the right end to shaft 22 while the left end forces plate 30 into clamping engagement with hub 24 and the three collars. With the plate held in such clamping relation, when it is necessary to replace the nails, plate 30 is forced against spring 32 thereby exposing the nails 40. The nails are then simply removed and replaced. Then, plate 30 is again moved into clamping engagement with the hub 24 and the three collars. Now, the cutter head assembly is again ready for use. It will be noted that removal and replacement of the nail cutters does not require any special tools. Rather, a bit of manual force to overcome the biasing spring 32 is all that is needed.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A cutting assembly comprising a shaft, a hub axially mounted to an outward shaft end, a flange axially attached to the hub, a plate slidably mounted in axial spaced relation to the flange, at least one collar means rotatably clamped between the flange and plate, and a removable cutter bar extending perpendicularly of the shaft and outwardly from the collar means to cut material as the shaft rotates, said collar means comprising a slotted shank for receiving the bar and a ring encircling the shank to prevent the bar from falling out of the shank, whereby sliding displacement of the plate away from the hub allows removal and replacement of the bar.

2. The structure of claim 3 wherein a bias means mounted to the shaft contacts the plate to cause clamping of the plate against the collar means.

3. A cutting head for a lawn edger comprising a driving shaft, a hub axially mounted to an outward shaft end, an annular flange axially attached to the hub, an annular plate slidably mounted against the hub and in axial spaced relation to the flange, a plurality of angularly spaced collar means clamped between the plate and flange, removable cutter bars received in respective collar means, said cutter bars extending perpendicularly of the shaft and radially outward of the collar means, each collar means comprising a headed split shank received in a respective aperture formed in the flange, a slit in the shank receiving the cutter bar, and a ring embracing the split shank to selectively retain the cutter bar therein, and means mounted to the driving shaft for biasing the plate against the hub to effect the clamping of the collar means, wherein relief of the biasing means exposes the cutter bars and allows their removal and replacement.

4. The structure of claim 5 together with a setscrew threadingly received in each ring and engaging a head of a cutter bar in the shank to maintain the radial position of the cutter bar.

5. A supporting collar for removably supporting a rod-like cutting element having a headed end on a rotary head, comprising a shank having mounting means on one end thereof and a longitudinal slot therein extending inwardly from the other end thereof to receive a radially outwardly extending cutting element therein, an annular ring having a longitudinal slot therein extending inwardly from one end thereof, said ring encircling said shank with their respective slots in alignment and with the headed end of said cutting element disposed between said ring and a peripheral surface of said shank and means to secure said cutting element in place.

6. The structure as defined in claim 5 wherein said shank includes a recess communicating with said slot receiving the headed end of the cutting element, screw means extending through the ring into the recess for securing the headed end of the cutting element in place, said mounting means including a headed end on said shank in spaced relation to the ring thereby defining an annular groove for rotatably mounting the collar on a rotary plate of a rotary head.

* * * * *